Oct. 8, 1946.  W. L. POLLARD  2,408,951
TRANSMISSION AND CONTROL THEREFOR
Filed Sept. 13, 1943  2 Sheets-Sheet 1
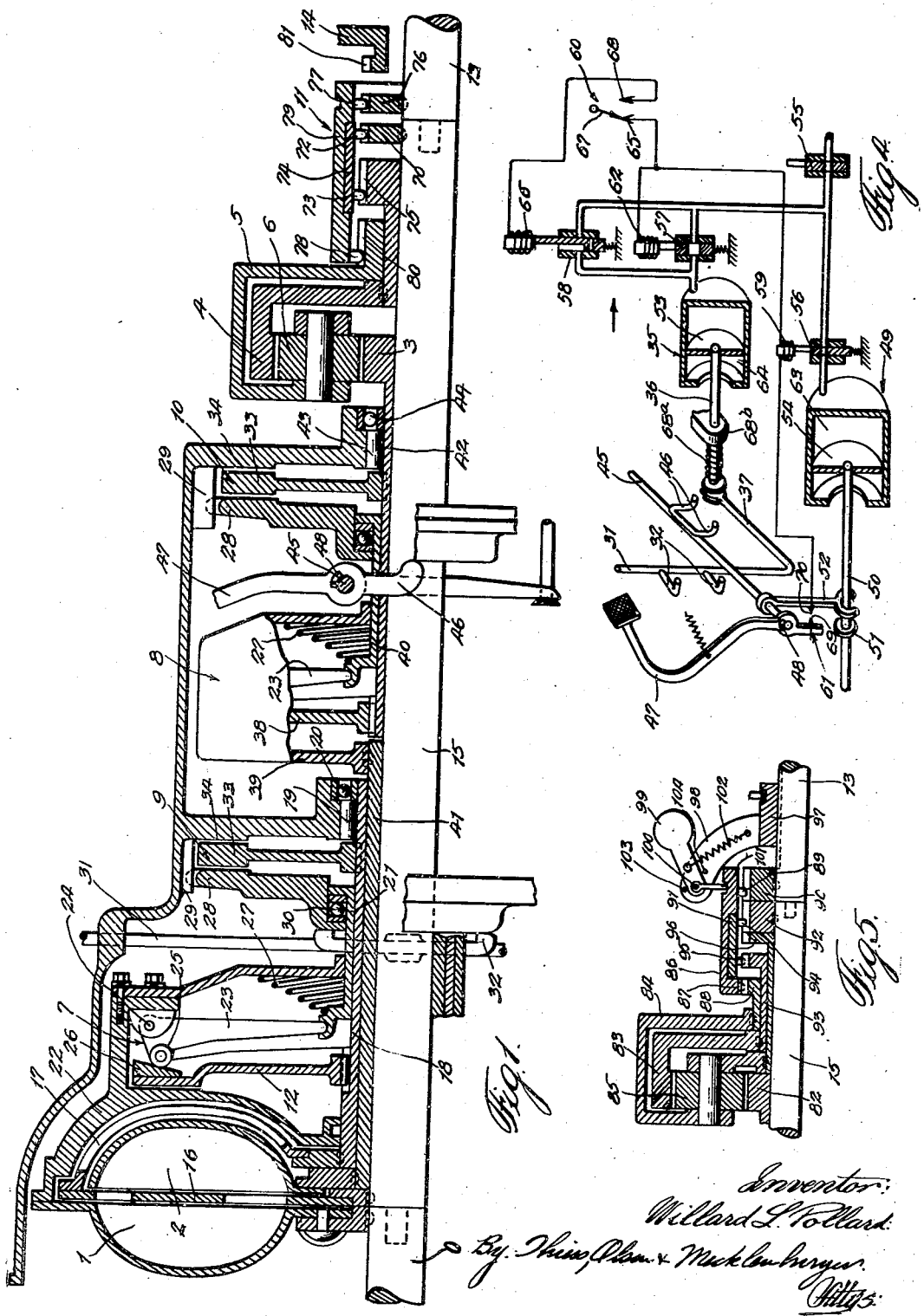

Oct. 8, 1946. W. L. POLLARD 2,408,951
TRANSMISSION AND CONTROL THEREFOR
Filed Sept. 13, 1943 2 Sheets-Sheet 2
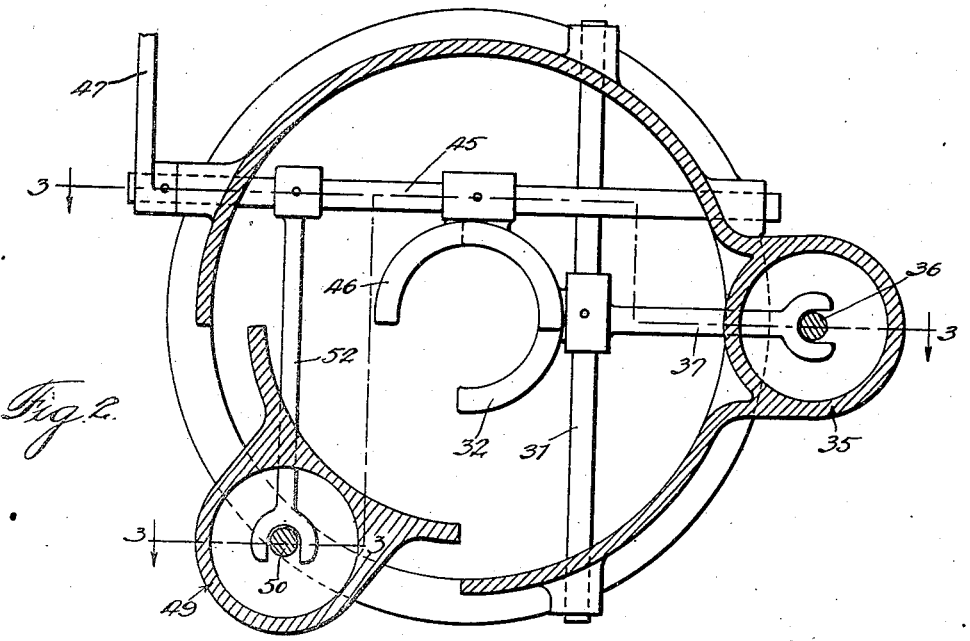
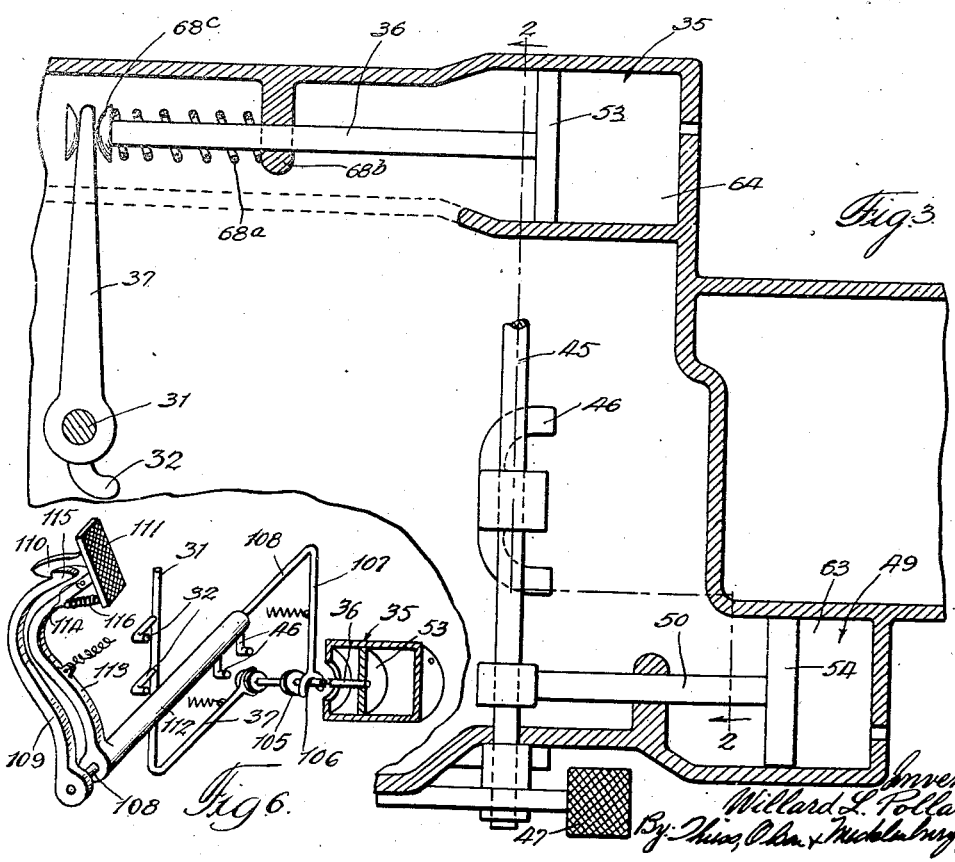
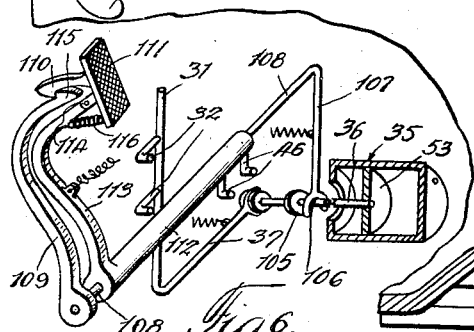

Patented Oct. 8, 1946

2,408,951

UNITED STATES PATENT OFFICE 2,408,951

TRANSMISSION AND CONTROL THEREFOR

Willard L. Pollard, Evanston, Ill.

Application September 13, 1943, Serial No. 502,144

7 Claims. (Cl. 74—260)

My invention relates to transmissions.

This application is a continuation in part of certain subject matter disclosed in Figs. 1-5, incl., in my co-pending application Serial No. 472,314, filed January 14, 1943, now Patent No. 2,378,035.

One of the objects of my invention is to provide a transmission for motor vehicles having automatic means for changing the gear ratio combined with improved manually controlled means for changing the gear ratio when desired.

A further object of my invention is to provide such a construction in which a foot operated clutch is used for disconnecting the clutch in shifting from forward to neutral and reverse, so that the possibility of creeping may be avoided and so that the shifting may be accomplished quickly.

A further object is to provide such a construction in which a foot operated clutch is used for shifting from high to second at any desired time in going uphill or downhill.

A further object of my invention is to provide a power actuated foot-controlled clutch which is also used in the automatic control.

Further objects and advantages of the invention will be apparent from the description and claims.

In the drawings, in which two forms of my invention are shown,

Figure 1 is a vertical axial sectional view of the transmission;

Fig. 2 is a rear end view showing the control for the transmission;

Fig. 3 is a horizontal axial sectional view showing the control;

Fig. 4 is a diagrammatic perspective view showing the control;

Fig. 5 is an axial sectional view showing another form of gearing; and

Fig. 6 is a perspective view showing another form of control apparatus.

General construction

Referring to the drawings in detail, the construction shown comprises a motor shaft 0, a fluid coupler having a drive rotor 1, keyed to the shaft 0, and a driven rotor 2 driven from the rotor 1, planetary gearing comprising a sun gear 3, a ring gear 4, a planet gear carrier 5, and planet gears 6 mounted on the gear carrier and meshing with the sun gear and ring gear, a clutch 7 for connecting and disconnecting the ring gear 4 with respect to the drive rotor 1, a clutch 8 for connecting and disconnecting the sun gear 3 with respect to the driven rotor 2, a brake mechanism 9 for holding the ring gear 4 against rotation, a brake 10 for holding the sun gear 3 against rotation, and a dog clutch mechanism 11 which, in one position, connects the ring gear 4 to the driven clutch member 12 and the propeller shaft 13 to the gear carrier 5; in another position, connects the ring gear 4 to the propeller shaft 13 and connects the gear carrier 5 to a fixed dog member 14 and, in an intermediate position, disconnects the driven clutch member 12 and the propeller shaft 13 from the ring gear 4 and gear carrier 5. The driven clutch member 12 is connected to rotate with the intermediate shaft 15 by means of a fluid transmitting torque transmitting disc 16 secured to the intermediate shaft 15, a spider or annulus 17 secured to the torque transmitting disc 16, and a tubular shaft 18 secured to the spider on which shaft the driven clutch member 12 is splined. This tubular shaft 18 is held against reverse rotation with respect to the direction of rotation of the motor by means of a one-way anchorage mechanism 19. An antifriction bearing 20 is provided for the tubular shaft 18

The clutch mechanism may be of any suitable type, that shown comprising a control sleeve 21 rotatable with the driving clutch member 22, a plurality of levers 23 engaging a channel in the clutch sleeve 21 and pivoted on the driving clutch member at 24, antifriction rollers 25 mounted on the levers 23, a bearing ring 26 engageable with the driven clutch plate 12 and rotatable with the driving clutch member 22, a spiral helical compression spring 27 pressing the clutch sleeve 21 to the left as viewed in Fig. 1, to throw the clutch in, a clutch shifting plate 28 non-rotatably held by means of ribs 29, a thrust bearing 30 between the clutch shifting plate 28 and the clutch sleeve 21, a vertical automatically controlled rockshaft 31 and a shifting yoke 32 mounted on this shaft engageable with the clutch shifting plate 28 for moving the clutch sleeve to the right to throw the clutch out.

The brake mechanism 9 comprises a brake plate 33 splined on the tubular shaft 18 and engaged by the clutch shifting plate 28 when the clutch is thrown out to clamp this brake plate 33 between the clutch shifting plate 28 and a braking surface 34 on the housing.

The clutch shifting yoke 32 is controlled by means of the vacuum operated cylinder and piston mechanism 35 (Figs. 2, 3, and 4), the piston rod 36 of which is connected with a lever 37 secured to the rockshaft 31 on which the clutch shifting yoke 32 is mounted.

The clutch mechanism 8 for controlling the connection and disconnection of the sun gear 3 with respect to the driven rotor 2 is in general similar to the clutch construction just described comprising a driven clutch plate 33 connectible and disconnectible with respect to the driving clutch member 39 by means of a clutch shifting yoke 40. The driving clutch member 39 is keyed to a tubular shaft 41, which shaft is keyed to the driven rotor 2 of the hydraulic coupler. The brake mechanism 10 is similar to the brake mechanism 9 associated with the front clutch and, when applied, holds the brake plate 33 which is splined on the tubular shaft 42 against rotation. The sun gear 3 is secured to this tubular shaft 42 and the driven clutch member 38 is splined thereon. A one-way anchorage device 43 is provided for holding the sun gear 3 against reverse rotation with respect to the direction of rotation of the driving clutch member. An antifriction bearing 44 is provided for the tubular shaft. The rockshaft 45 on which the clutch shifting yoke 46 is mounted is subject to two controls, one controller being the pedal 47 which has a lost motion connection at 48 with the rockshaft 45 on which the clutch shifting yoke is mounted and the other controller comprising a power operated cylinder and piston mechanism 49, the piston rod 50 of which has a lost motion connection 51 with the rock arm 52 secured to the rockshaft 45.

General operation

In considering the operation, it is to be borne in mind that when the front clutch 7 is in, the front brake 9 is off and that when the front clutch is out, the front brake is on, and similarly, with respect to the rear clutch, that when the rear clutch 8 is in, the rear brake 10 is off, and when the rear clutch is out, the rear brake is on. It is also to be borne in mind that when the front clutch 7 is in, the ring gear 4 is connected to rotate with the driving coupler rotor 1, and that when the front clutch is out the ring gear is held against rotation by the front brake 9; also, that when the rear clutch 8 is in, the sun gear 3 is connected to rotate with the driven rotor 2 of the hydraulic coupler, and that when the rear clutch is out, the sun gear is held against rotation by the rear brake mechanism 10. With this construction, it will be seen that when the rear clutch 8 is in and the front clutch 7 is out, the sun gear 3 will be connected to rotate with the driven rotor of the hydraulic coupler and the ring gear will be held against rotation by the front brake, giving a low speed gear ratio which may be around .3; that when the front clutch 7 is in and the rear clutch 8 is out, the ring gear 4 will be connected to rotate with the drive rotor 1 of the hydraulic coupler and the sun gear 3 will be held against rotation by the rear brake for intermediate speed gear ratio which may be around .7, and that when both the front clutch and the rear clutch are in, the sun gear will be connected to rotate with the driven rotor of the coupler and the ring gear will be connected to rotate with the drive rotor of the coupler, giving substantially direct high speed. This general construction is similar to that shown in my co-pending applications Serial Numbers 410,815, 462,356, and 472,314.

Control of clutches and brakes

Suitable automatic controls may be provided for the two power cylinders 35 and 49 which control the clutches and brakes. The pistons 53 and 54 may be operated from any suitable pressure source, as by connecting them with the reduced pressure in the intake manifold. For this purpose, suitable valves are provided in the conduits leading from the cylinders to the manifold. These include a manually operated valve 55 (Fig. 4) which can be operated to shut off all communication between the cylinders and the manifold, a solenoid controlled valve 56 for alternatively placing the sun gear controlling cylinder in communication with the manifold or with the atmosphere, a similar solenoid operated valve 57 controlling communication between the ring gear controlling cylinder and the manifold and atmosphere, and a solenoid operated valve 58 in parallel with the solenoid operated valve 57 also controlling communication between the ring gear controlling cylinder and the manifold and atmosphere. The solenoid 59 controlling the valve 56 may be controlled both by the automatic controller 60 and by the pedal-operated controller 61. The automatic controller 60 may be of any suitable type; for example, such as shown in my co-pending application Serial No. 401,162, filed July 5, 1941. The solenoids 59 and 62 which control the sun gear cylinder 63 and ring gear cylinder 64, respectively, may be simultaneously energized by the automatic controller 60 through the contact 65, thus simultaneously placing both cylinders 63 and 64 in communication with the suction manifold. The solenoid 66 which also controls the ring gear cylinder 64 is energized by engagement of the automatic controller contact 67 with the contact 68.

Referring first to the fully automatic control for the gear ratio changes, when the automatically controlled pivoted contact 67 is not in engagement with either of the contacts 65 or 68, the solenoids will all be deenergized and the front clutch 7 will be out, the front brake 9 will be on, the rear clutch 8 will be in, and the rear brake 10 will be off. The coil compression spring 68a, acting between an abutment 68b on the casing and a shoulder 68c on the piston rod 36, will hold the clutch 7 out and the brake 9 on, as may be seen from Figs. 3 and 4. This will result in low gear.

When the automatic control contact 67 engages the contact 65, the solenoids 62 and 59 will both be energized placing both cylinders 63 and 64 in communication with the exhaust. This will throw the front clutch in, connecting the ring gear to rotate with the motor shaft 0 and will throw the rear clutch 8 out and the rear brake 10 on, holding the sun gear against rotation, thus giving intermediate speed. When conditions become such that the contact 67 automatically engages the contact 68, the solenoids 59 and 62 will be deenergized but the solenoid 66 will be energized to maintain communication between the cylinder 64 and the vacuum to hold the front clutch 7 in engagement. When the solenoid 59 is deenergized, the rear clutch spring 27 will throw the rear clutch 8 into engagement, thus connecting the sun gear to rotate with the driven rotor 2. This condition will give substantially direct drive.

It will be seen that when the car is in direct drive, it can be placed in intermediate drive at any time, simply by pressing down on the clutch pedal 47, disconnecting the rear clutch 8 and placing the brake 10 in on-condition, thus holding the sun gear 3 against rotation. The lost motion connection 51 between the lever 52 and the piston rod 50 enables the clutch to be thrown out quickly without waiting for the action of the piston 54, although if the clutch pedal 47 is depressed gradually, the piston 54 will keep up with the lever 52 and do the actual work of throwing the clutch out and applying the brake. This is accomplished by means of the live contact 69 on the pedal operated controller 61 which, when the pedal 47 is depressed, engages the contact 70 on the arm 52 which contact 70 is connected with the solenoid 59. This will require only slight pedal pressure as the actual work will be done by the piston 54.

For reverse, the clutch pedal 47 is depressed to throw the clutch 8 out and the reverse dog clutch mechanism 11 is shifted rearwardly as viewed in Fig. 1. This may be accomplished by a manually operated shifter yoke (not shown) and engaging the outer clutch sleeve 79 which carries with it the inner clutch sleeve 74. In this position, the gear carrier 5 is held against rotation and the ring gear 4 is connected to rotate with the propeller shaft 13.

The connection from the ring gear to the propeller shaft is through the clutch sleeve 74, the front teeth 73 of which engage the clutch sleeve 75 and the rear teeth 72 of which engage the clutch ring 76 on the propeller shaft 13. The gear carrier 5 is held against reverse rotation by the clutch sleeve 79, the front teeth 78 of which engage the clutch ring 80 on the gear carrier and the rear teeth 77 of which engage the teeth 81 on the fixed ring 14. Under these conditions, the sun gear 3 is driven from the turbine rotor 2 through the clutch 8, the gear carrier 5 is held against reverse rotation, and the ring gear 4 and propeller shaft 13 are rotated in a reverse direction at relatively low speed.

When the clutch assembly 11 is in forward position, the ring gear 4 is connected with the intermediate shaft 15 through the clutch sleeve 74 and the gear carrier 5 is connected with the propeller shaft 13 through the clutch sleeve 79.

The construction shown in Fig. 5, which may be substituted for the reverse mechanism shown in Fig. 1, enables four forward speeds and reverse to be obtained. The gears 82, 83, and 85 correspond to the gears 3, 4, and 6 of Fig. 1. The low, second, and third speed may be the same as that described in connection with Figure 1. For fourth speed, or overdrive, the dog clutch construction shown is used. This comprises a toothed clutch member 88 keyed to the gear carrier 84, a toothed clutch member 93 keyed to the ring gear 83, a toothed clutch member 96 also keyed to the gear carrier, a toothed clutch member 92 keyed to the intermediate shaft 15, a toothed clutch member 90 keyed to the propeller shaft 13, a clutch sleeve 91 having clutch teeth 94 slidable in the clutch member 92 and also having clutch teeth 95 which, in one position, engage the clutch member 93 and, in another position, engage the clutch member 90, a second clutch sleeve 86 surrounding the first sleeve having clutch teeth 89 slidable in the clutch teeth of the clutch member 90 and having teeth 87 which, in one position, engage the teeth of the clutch member 88 and, in another position, engage the teeth of the clutch member 93.

A groove is provided for engagement with the shifting arm 101 on the centrifugal control apparatus. The centrifugal control mechanism comprises a sleeve 97 splined on the propeller shaft 13, a plurality of arms 98 rotatable with the sleeve 97, weighted arms 99 pivoted at 100 on the arms 98, rockable with the arms 101, springs 102 acting against the centrifugal force of the weighted arms and stops 103 and 104 for limiting the movement of the arms. The sleeve 97 may be shifted longitudinally of the shaft by a suitable manually operable shifter yoke (not shown).

When the dog clutch mechanism is in the left-hand position, as shown in Fig. 5, the clutch sleeve 86 connects the cage 84 with the shaft 13 and the sleeve 91 connects the ring 83 with the shaft 15. When the dog clutch is moved to the right-hand position, the sleeve 86 will connect the propeller shaft 13 with the ring gear 83 and the sleeve 91 will connect the gear carrier 84 with the shaft 15 through dog clutch 96. This position of the dog clutch may be used for shifting between third and fourth speed and for reverse. This construction may in general be similar to that shown in my co-pending application Serial No. 462,356, filed October 17, 1942, now Patent No. 2,352,004.

As indicated above, in this position the gear carrier 84 is connected with the shaft 15. For reverse, the shaft 15 is held against rotation by the brake 9 to hold the gear carrier 84 against rotation, and the sun gear is connected to rotate with the turbine 2 by means of the clutch 8. This causes reverse rotation of the ring gear 84 and the propeller shaft 13.

When the car speed is high enough so that the centrifugal force device can exert force sufficient to shift the sleeves 86 and 91 rearwardly when permitted to do so, the planetary gear members are brought into synchronism and the rearward shift of the sleeves 86 and 91 takes place. This synchronism may be effected in various ways; for example, by allowing the accelerator pedal to rise slightly to slow down the motor speed while the car speed continues substantially the same. This rearward shift of the sleeves 86 and 91 connects the shaft 15 with the gear carrier 84 and connects the propeller shaft 13 with the ring gear 83. For overdrive, the brake 9 is released, the clutch 7 is connected, the clutch 8 is released, and the brake 10 is connected. Under these conditions the gear carrier 84 is driven from the clutch 7, the sun gear 82 is held against rotation, and the ring gear 83 and propeller shaft 13 are driven at a speed greater than that of the gear carrier. With these connections, overdrive may be obtained by depressing the pedal 47 to hold the sun gear against rotation, and third speed (substantially direct drive) can be obtained by releasing the pedal 47 to throw the clutch 8 in and connect the sun gear 82 to rotate with the turbine rotor 2.

If it is desired to go into reverse, the car is brought to a standstill, in which condition the solenoids 66 and 62 will be deenergized and the front brake 9 will be on. The pedal 47 is then depressed to disconnect the clutch 8 and the sleeve 97 is shifted rearwardly by any suitable reverse lever to connect the gear carrier 84 with the shaft 15 and to connect the ring gear 83 with the propeller shaft 13. The pedal 47 is then released and the clutch 8 connects the sun gear 82 to rotate with the turbine rotor 2. Under these conditions, the gear carrier 84 is held against rotation by the brake 9, the sun gear 82 rotates with the turbine rotor, and the ring gear and propeller shaft are rotated reversely with respect to the rotation of the turbine rotor 2.

With the pitch ratio of 3:7 of the sun gear and ring gear, this construction gives four forward speed ratios of approximately .3, .7, 1 and 1.4 and a reverse speed ratio of .4.

The spacing of the clutch teeth rings of the dog clutch members 74, 79, 86, 81, 88, 95 and 96, both in Fig. 1 and Fig. 5, may be such that in intermediate position of the clutch members they will be in neutral position with no driving connection with the dog clutch members 70, 76 and 81 so that the transmission can be placed in neutral and the motor allowed to run with no danger of creeping of the car.

It will be noted that in second and fourth gear ratio, all of the power is by-passed around the hydraulic drive and that in third gear, 70 per cent of the power is by-passed. Also, that the drive may be disconnected at any time simply by depressing the clutch pedal 47 far enough to throw the clutch 8 out; that a power device is provided which avoids the necessity for much foot power in throwing out the clutch 8; that this power device is used in the automatic control, and that in starting, either in forward or reverse, the smooth action of the hydraulic flywheel is utilized.

Fig. 6 shows a form of control apparatus which may be used instead of that shown in Fig. 4. In this form, the clutch shifting yokes 32 and 46 and the power actuator 35 may be substantially as shown in Fig. 4 and may be used to control substantially the same transmission as that shown in Fig. 1. In this form, the power piston 53 is connected so that when it moves to the right, it will operate the lever 37 and rock shaft 31 to cause the clutch shifting fingers 32 to move to allow the clutch 12 to connect the ring gear to the power input and so that it will cause the button 105 on the piston rod 36 to engage the yoke 106 on the rock arm 107 to rock the rock shaft 108 and the hook lever 109 which engages the hook 110 on the tiltable latch pedal 111 to rock the sleeve 112 and the clutch fingers 46 to throw the clutch plate 38 out to disconnect the sun gear 3. This throwing in of the ring gear clutch and throwing out of the sun gear clutch will shift the transmission from low to second.

The latch pedal 111 is pivotally mounted on the pedal lever 113 at 114 and is normally biased toward latching position with the hook 115 on the power lever 109 by means of a coil compression spring 116. To disconnect the clutch pedal 111 from the power lever 109, it is only necessary to press down on the lower end of the tiltable latch pedal 111 to tip the pedal hook 110 upwardly out of engagement with the hook 115 on the power lever 109. When the pedal 111 is disengaged from the power lever 109, the pressure on the foot pedal can be relieved to let the sun gear clutch in, thus shifting from second to third speed.

At low speeds, before the speed control of the power actuator 35 causes it to act, the clutch pedal 111 may be used in the ordinary manner for connecting and disconnecting the sun gear with respect to the power input.

Further modifications will be apparent to those skilled in the art and it is desired, therefore, that the invention be limited only by the scope of the appended claims.

Having thus described my invention, what I claim and desire to secure by Letters Patent is:

1. A variable speed transmission and control therefor comprising a three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means controlled by speed for automatically disengaging the sun gear clutch and holding the sun gear against reverse rotation and engaging the ring gear clutch for shifting from low to second speed, and manually controllable means for engaging the sun gear clutch for shifting from second to third speed.

2. A variable speed transmission and control therefor comprising a three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means controlled by speed for automatically disengaging the sun gear clutch and holding the sun gear against reverse rotation and for engaging the ring gear clutch for shifting from low to second speed, and pedal controllable means for engaging the sun gear clutch for shifting from second to third speed.

3. A variable speed transmission and control therefor comprising a reverse and three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means controlled by speed for automatically disengaging the sun gear clutch and holding the sun gear against reverse rotation and for engaging the ring gear clutch for shifting from low to second speed, manually controllable means for engaging the sun gear clutch for shifting from second to third speed, a driven shaft and connecting and disconnecting power path shifting means which in one position connects the ring gear with the driven member of its clutch and in another position connects it with the driven shaft, and which in one position connects the gear carrier with the driven shaft and in another position holds the gear carrier against rotation.

4. A variable speed transmission and control therefor comprising a reverse and three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means for engaging the sun gear clutch and disengaging the ring gear clutch for low speed, means for disengaging the sun gear clutch and engaging the ring gear clutch for shifting from low to second speed, and for engaging the sun gear clutch for shifting from second to third speed, a driven shaft and connecting and disconnecting power path shifting means which in one position connects the ring gear with the driven member of its clutch and in another position connects it with the driven shaft, and which in one position connects the gear carrier with the driven shaft and in another position holds the gear carrier against rotation.

5. A variable speed transmission and control therefor comprising a three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means for engaging the sun gear clutch and disengaging the ring gear clutch for low speed, means for disengaging the sun gear clutch and engaging the ring gear clutch for shifting from low to second speed and for engaging the sun gear clutch for shifting from second to third speed, said clutch means and holding means comprising two power driven driving clutch pressure plates, one for the sun gear and one for the ring gear, two nonrotatable brake pressure plates, one for the sun gear and one for the ring gear, two control elements shiftable longitudinally of the axis of said planetary transmission, and means controlled by one element for alternatively rendering the sun gear clutch pressure plate and the sun gear brake pressure plate effective and means controlled by the other element for alternatively rendering the ring gear clutch pressure plate and the ring gear brake pressure plate effective.

6. A variable speed transmission and control therefor comprising a three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means for engaging the sun gear clutch and disengaging the ring gear clutch for low speed, means for disengaging the sun gear clutch and engaging the ring gear clutch for shifting from low to second speed and for engaging the sun gear clutch for shifting from second to third speed, said clutch means and holding means comprising a power driven driving clutch pressure plate for the sun gear, a nonrotatable brake pressure plate for the sun gear, a control element shiftable longitudinally of the axis of said planetary transmission, and means controlled by said control element for alternatively rendering the sun gear clutch pressure plate and the sun gear brake pressure plate effective.

7. A variable speed transmission and control therefor comprising a three speed forward planetary transmission including a sun gear, a ring gear, a gear carrier and planet gearing mounted on said gear carrier and meshing with said sun gear and ring gear, clutch means for connecting said sun gear with the power input, clutch means for connecting said ring gear with the power input, means for holding said sun gear and ring gear against reverse rotation when not connected with the power input, means for disengaging the sun gear clutch and engaging the ring gear clutch for shifting from low to second speed and for engaging the sun gear clutch for shifting from second to third speed, said clutch means and holding means comprising a power driven driving clutch pressure plate for the ring gear, a nonrotatable brake pressure plate for the ring gear, and a control element shiftable longitudinally of the axis of said planetary transmission, and means controlled by said control element for alternatively rendering the ring gear clutch pressure plate and the ring gear brake pressure plate effective.

WILLARD L. POLLARD.